(No Model.)
A. SHEDLOCK.
AIR COMPRESSOR.
No. 586,669. Patented July 20, 1897.
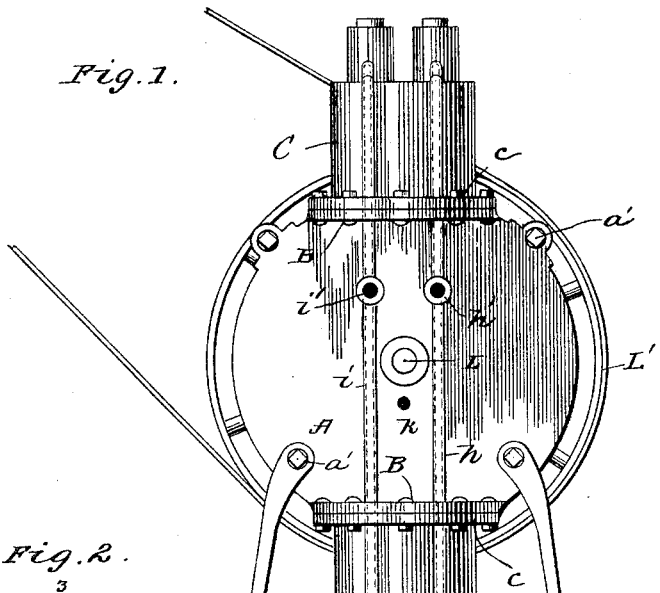
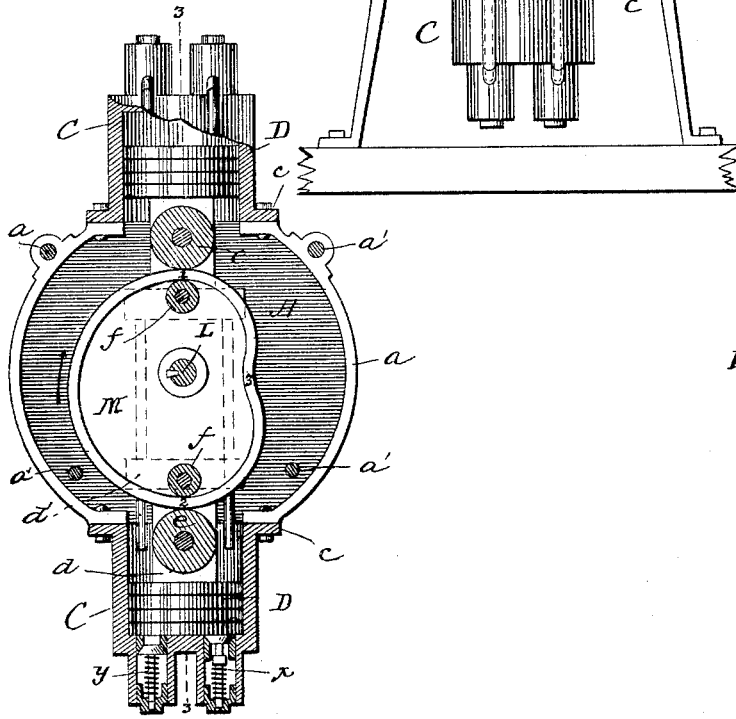
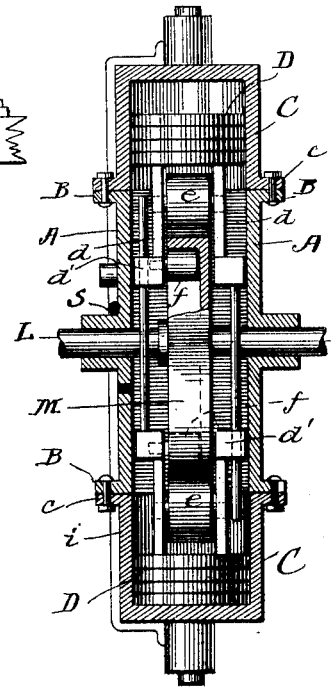
WITNESSES:
Frank S. Ober
Baltus DeLong
INVENTOR
Alfred Shedlock
BY
Baldwin, Davidson & Wight
ATTORNEYS.

UNITED STATES PATENT OFFICE.

ALFRED SHEDLOCK, OF JERSEY CITY, NEW JERSEY.

AIR-COMPRESSOR.

SPECIFICATION forming part of Letters Patent No. 586,669, dated July 20, 1897.

Application filed October 16, 1891. Serial No. 408,861. (No model.)

*To all whom it may concern:*

Be it known that I, ALFRED SHEDLOCK, a citizen of the United States, residing in Jersey City, county of Hudson, State of New Jersey, have invented certain new and useful Improvements in Air-Compressors, of which the following is a specification.

My invention relates to that class of air-compressors in which opposite pistons are alternately reciprocated by power from an interposed shaft. I employ a cam of peculiar shape carried by the shaft and located between the pistons and acting to reciprocate them in a manner hereinafter described. The body of the compressor, in which the cam rotates, is in the preferred construction composed of two cast cup-shaped or flanged sections or plates that are bolted together with their edges or flanges abutting, thus forming a chamber, in which the cam rotates. The shaft has its bearings in the plates and carries a driving-pulley. The cylinders are each cast in one piece and are bolted directly upon opposite sides of the periphery of the casing. The inlet and outlet air ducts or passages leading to the respective inlet and outlet valves of the two cylinders may be cast in the sides or walls of the cylinders and casing, and when the parts are bolted together the ducts or passages coincide.

In the accompanying drawings, Figure 1 is an elevation of my improved compressor; Fig. 2, a partial longitudinal section, and Fig. 3 a transverse section on the line 3 3 of Fig. 2.

The casing is composed of two plates A, preferably substantially circular, each of which has a flange $a$ projecting at right angles from the same face of the plate and on opposite sides of the center thereof. The flanges are abutted and the parts secured together by transverse bolts $a'$. The openings formed in the opposite sides of the periphery of the casing between the ends of adjacent flanges $a$ are each surrounded by annular flange B, half of the flange being cast on each plate A. The cylinders C, which may also be cast, are formed at their open ends with flanges $c$, that are bolted to the flanges B. The opposite end of each cylinder has cast therein two tubular projections, in which the inlet-valve $x$ and the outlet-valve $y$ are respectively seated. Each piston D has two standards $d$ projecting from its inner face, and between them are mounted rollers $e\ f$. The standards are widest at the top, thus forming projections $d'$. Two guide-rods $g$ are rigidly secured in the projections $d'$ of one of the standards of each piston and pass through apertures in the projections on the corresponding standard of the opposite piston. Each piston is thus guided upon one of the standards of the other piston.

The duct or passage $h$ leading to each inlet-valve is cast in the walls of the cylinders and in the wall of the casing. When the parts are bolted together as described, these ducts coincide, so as to form a continuous passage, the air-inlet of which is shown at $h'$. The air-outlet duct $i$ leading from each outlet-valve is similarly formed, and the compressed air is discharged from the opening $i'$ therein. An aperture $k$ may be formed in one or both of the plates of the casing, and as the pistons are reciprocated, as presently described, air will be alternately drawn into the casing and forced out of it. The apparatus is thus ventilated and kept cool.

The driving-shaft L has its bearings in the plates A and carries a driving-pulley L'. A cup-shaped cam M is keyed upon the shaft within the casing, and its flange or rim lies between the two rollers $e\ f$ of each piston. As the cam rotates the pistons are reciprocated in the following manner: In the position shown in Fig. 2 the lower piston has been forced to the limit of its stroke and the upper piston occupies a position about midway in the cylinder. The cam being rotated in the direction of the arrow the upper piston will during a half-revolution of the cam be forced with a uniform speed to the limit of its stroke, because the curve of the left-hand portion of the cam, as seen in Fig. 2, rises or increases gradually from the point 1 to the point 2. During one-half of this half-revolution the lower piston is withdrawn to its innermost position—that is, until its rollers $e\ f$ embrace the lowest part 3 of the cam, the cam falling or approaching the center of motion between the points 2 3. During the next quarter of a revolution to complete the half-revolution referred to that portion of the cam between the points 3 1 and which gradually rises or leaves the center of motion acts to advance the lower piston part way into the cylinder—that is, into the position occupied by the upper piston, as seen in Fig. 2. During the next half of a revolution the lower piston is driven with uniform speed to the limit of its stroke, during which time the upper piston has been withdrawn and again advanced to the position shown in the drawings. This operation possesses several advantages, among which are the following: The compressed air from each cylinder is discharged through the outlet-valve during the time that the part of the cam between the pistons 1 2 is acting upon the piston, and as this part of the cam has a gradually and uniformly increasing rise the compressed air is forced out with an even pressure, thus avoiding a sudden fluctuation or rise of pressure. At the same time during this half-revolution the opposite side of the cam is employed in fully retracting the other piston and then advancing it about half-way to compress the air in its cylinder to about the pressure desired. When the half of the cam between the points 1 and 2 acts upon either piston to gradually drive it to the limit of its stroke, the air from the cylinder is forced out through the valve with an approximately uniform flow at the working pressure.

The pistons are described as being at half of their stroke when commencing to discharge the air, which is then at half-volume. For other degrees of compression the pistons will by proper shaping of the cam be caused to occupy the necessary position for the required compression. With this organization the power required to drive the compressor is distributed over a greater portion of the revolution of the driving-pulley than is the case where the compressing-piston is actuated by a crank.

The casing formed by the plates A is preferably a closed one, as shown, to protect the moving parts from dust, but of course it could be a mere skeleton.

I claim as my invention—

1. The combination, substantially as set forth, of two cylinders, their pistons, a driving-cam, one half of which has a gradually-increasing rise, and the remaining half of which falls and then rises again, and connecting mechanism by which the cam reciprocates the pistons, the cylinder and pistons being diametrically opposed relative to the cam.

2. The combination, substantially as set forth, of the flanged or cup-shaped plates forming the casing, the cylinders secured to opposite sides thereof, their pistons, the standards on the pistons and the guide rod or rods rigidly secured to one of the standards of each piston and working in ways or apertures in the corresponding standard of the other piston, the driving-shaft, the cam carried thereby within the casing, and connecting mechanism by which the cam reciprocates the pistons.

3. The combination, substantially as set forth, of a casing, the opposite cylinders mounted thereon, their pistons, the standards on the pistons and the guide rod or rods rigidly secured to one of the standards of each piston and working in ways or apertures in the corresponding standard of the other piston.

In testimony whereof I have hereunto subscribed my name.

ALFRED SHEDLOCK.

Witnesses:
FRANK S. OBER,
EDWARD C. DAVIDSON.